US012724273B2

(12) United States Patent
Lee

(10) Patent No.: US 12,724,273 B2
(45) Date of Patent: Sep. 1, 2026

(54) OPTICAL DEVICE FOR AUGMENTED REALITY HAVING REFRACTIVE SPACE

(71) Applicant: LETINAR CO., LTD, Anyang-si (KR)

(72) Inventor: Kwang Bok Lee, Suwon-si (KR)

(73) Assignee: LETINAR CO., LTD, Anyang-si (KR)

( * ) Notice: Subject to any disclaimer, the term of this patent is extended or adjusted under 35 U.S.C. 154(b) by 387 days.

(21) Appl. No.: 18/550,082

(22) PCT Filed: Dec. 17, 2021

(86) PCT No.: PCT/KR2021/019287

§ 371 (c)(1),
(2) Date: Sep. 11, 2023

(87) PCT Pub. No.: WO2022/255579

PCT Pub. Date: Dec. 8, 2022

(65) Prior Publication Data

US 2024/0151978 A1 May 9, 2024

(30) Foreign Application Priority Data

Jun. 3, 2021 (KR) ........................ 10-2021-0072301

(51) Int. Cl.
*G02B 27/01* (2006.01)

(52) U.S. Cl.
CPC ................................ *G02B 27/0172* (2013.01)

(58) Field of Classification Search
CPC ................................................. G02B 27/0172
See application file for complete search history.

(56) References Cited

U.S. PATENT DOCUMENTS 5,886,822 A 3/1999 Spitzer
2014/0211322 A1 7/2014 Bohn et al.
2019/0204601 A1* 7/2019 Ha .................... G02B 27/0172
2019/0250400 A1* 8/2019 Ricks .................... G02B 27/10
2020/0183152 A1* 6/2020 Pennell ............... G02B 6/0055

FOREIGN PATENT DOCUMENTS

JP 6287131 B2 3/2018
JP 2020512574 A 4/2020
KR 101660519 B1 9/2016
KR 102200144 B1 1/2021
KR 102252287 B1 5/2021
KR 1020210053249 A 5/2021

* cited by examiner

*Primary Examiner* — Edmond C Lau
(74) *Attorney, Agent, or Firm* — Rabin & Berdo, P.C.

(57) ABSTRACT

The present invention provides an optical device for augmented reality having a refractive space, the optical device including: a first optical element configured to transfer virtual image light to a second optical element; the second optical element configured to transfer the virtual image light toward the pupil of an eye of a user; an optical means configured such that the first optical element and the second optical element are embedded therein; and a refractive space formed inside the optical means; wherein the refractive space has a first surface and a second surface; and wherein the virtual image light output from the image output unit enters the first optical element through the second surface of the refractive space, is reflected by the first optical element and then output through the second surface of the refractive space, and is then transferred to the second optical element.

27 Claims, 13 Drawing Sheets

OPTICAL DEVICE FOR AUGMENTED REALITY HAVING REFRACTIVE SPACE

TECHNICAL FIELD

The present invention relates to an optical device for augmented reality, and more particularly, to an optical device for augmented reality capable of more precisely adjusting the performance of an optical system by forming a refractive space for refracting virtual image light inside an optical means.

BACKGROUND ART

Augmented reality (AR) refers to technology that superimposes a virtual image, provided by a computer or the like, on a real image in the real world and then provides a resulting image, as is well known. In other words, AR refers to a technology that additionally provides the virtual image information augmented from visual information of the real world to a user.

An apparatus for realizing such augmented reality requires an optical combiner that enables the simultaneous observation of virtual images and real images of the real world. As such optical combiners, there are known half mirror-type combiners and holographic/diffractive optical element (HOE/DOE)-type combiners.

However, half mirror-type combiners have problems in that the transmittance of virtual images is low and it is difficult to provide a comfortable fit because the volume and weight thereof are increased to provide a wide FOV. In order to reduce the volume and weight, there have also been proposed technologies such as Light-guide Optical Element (LOE), which has a plurality of small half-mirrors to be disposed inside a waveguide. This technology also has limitations in that the manufacturing process is complicated and also luminous uniformity may easily be lowered because the image light of a virtual image needs to pass through the half-mirrors a number of times inside the waveguide.

Furthermore, HOE/DOE-type combiners generally employ nanostructure gratings or diffraction gratings. Since they are manufactured in a significantly precise process, the technology has limitations in that the manufacturing cost is high and the yield for mass production is low. Furthermore, due to the difference in diffraction efficiency according to the wavelength band and the incident angle, this technology has limitations in terms of color uniformity and the low sharpness of an image. Holographic/diffractive optical elements are often used in conjunction with waveguides as in the LOEs described above. Accordingly, this technology still has the same problems.

In addition, these conventional optical combiners have limitations in that a virtual image is out of focus when a user changes a focal length when gazing at the real world. In order to overcome this problem, there has been proposed a technology using a prism capable of adjusting the focal length of a virtual image or a variable focus lens capable of electrically controlling the focal length. However, this technology also has a problem in that a user needs to perform a separate operation to adjust the focal length and also separate hardware and software are required for controlling the focal length.

In order to overcome the problems of the prior art, the present applicant has developed a technology that projects a virtual image onto the retina through the pupil by using a reflective unit in the form of a pin mirror having a smaller size than the human pupil (see prior art document 1).

FIG. 1 is a diagram showing an optical device 100 for augmented reality as disclosed in prior art document 1.

The optical device 100 for augmented reality shown in FIG. 1 includes an optical means 10, a reflective unit 20, and an image output unit 30.

The optical means 10 is a means for serving to transmit real object image light, which is image light output from an object in the real world, therethrough and to output the virtual image light, which is reflected by the reflective unit 20, to the pupil 40. The reflective unit 20 is embedded and disposed inside the optical means 10.

The optical means 10 may be made of, e.g., a transparent resin material like a eye-glass lens, and may be fixed by a frame (not shown) such as a eye-glass frame.

The image output unit 30 is a means for outputting virtual image light. For example, the image output unit 30 may have a micro-display unit configured to display a virtual image on a screen and output virtual image light corresponding to the displayed virtual image, and a collimator configured to collimate the image light, output from the micro-display unit, into parallel light.

The reflective unit 20 is a means for transferring the virtual image light, output from the image output unit 30, toward the pupil 40 of a user by reflecting the virtual image light.

The reflective unit 20 of FIG. 1 is formed to have a smaller size than a human pupil. Since it is known that the size of the average pupil of people is about 4 to 8 mm, it is preferable that the reflective unit 20 be formed to have a size of 8 mm or less. By forming the reflective unit 20 to have a size of 8 mm or less, the depth of field for light entering the pupil 40 through the reflective unit 20 may be made almost infinite, i.e., considerably deep.

In this case, the depth of field refers to a range within which an image for augmented reality is recognized as being in focus. As the depth of field increases, the range of focal lengths for virtual images widens correspondingly. Accordingly, even when a user changes the focal length for the real world while gazing at the real world, the user always recognizes an image for augmented reality as being in focus regardless of such a change. This may be viewed as a type of pinhole effect.

Accordingly, by forming the reflective unit 20 to have a size smaller than that of the average pupil, the user may always view a clear virtual image even when the user changes the focal length for a real object.

However, the device shown in FIG. 1 has limitations in that the field of view is narrow and the overall size, thickness, and volume of the device increase because an optical means such as the collimator is used for the image output unit 30.

In order to overcome these problems, the present applicant has proposed a technology that arranges a collimator inside an optical means 10 without using a collimator in an image output unit 30 (see prior art document 2).

FIG. 2 is a diagram showing an optical device 200 for augmented reality as disclosed in prior art document 2.

The optical device 200 for augmented reality of FIG. 2 is different from the optical device for augmented reality 100 of FIG. 1 in that a plurality of reflective units 20 are disposed and an auxiliary reflective unit 50 serving as a collimator is disposed inside the optical means 10.

The optical device 200 for augmented reality of FIG. 2 operates as follows:

First, a virtual image output from the image output unit 30 is reflected by total internal reflection on an inner surface of the optical means 10 and then transferred to the auxiliary reflective unit 50. The virtual image reflected by the auxiliary reflective unit 50 is reflected again by total internal reflection on the inner surface of the optical means 10 and then transferred to the reflective units 20, and the reflective units 20 transfers the virtual image to the pupil 40 by reflecting it.

The plurality of reflective units 20 are disposed in the optical device 200 for augmented reality of FIG. 2, so that a wider field of view can be provided. Furthermore, the function of a collimator is performed by the auxiliary reflective unit 50 disposed inside the optical means 10 without using a collimator in the image output unit 30, so that form factors such as the overall size, volume, weight, and thickness of the device can be significantly reduced.

However, the optical device 200 for augmented reality of FIG. 2 has a problem in that the overall design of an optical system is not easy because the overall performance of the optical system is excessively dependent on the auxiliary reflective unit 50.

[Prior Art Document 1]

Korean Patent No. 10-1660519 (published on Sep. 29, 2016)

[Prior Art Document 2]

Korean Patent No. 10-2200144 (published on Jan. 8, 2021)

DISCLOSURE

Technical Problem

An object of the present invention is to provide an optical device for augmented reality capable of more precisely adjusting the performance of an optical system by forming a refractive space for refracting virtual image light inside an optical means.

Another object of the present invention is to provide an optical device for augmented reality capable of adjusting the focal length of a virtual image while providing a clearer virtual image by disposing an optical element serving as a collimator inside an optical means and also employing the optical element and a refractive space together.

Technical Solution

In order to accomplish the above objects, the present invention provides an optical device for augmented reality having a refractive space, the optical device including: a first optical element configured to transfer virtual image light, output and transferred from an image output unit, to a second optical element; the second optical element configured to transfer the virtual image light, transferred from the first optical element, toward the pupil of an eye of a user; an optical means configured such that the first optical element and the second optical element are embedded and disposed therein; and a refractive space formed inside the optical means; wherein the refractive space has a first surface on which the first optical element is disposed, and a second surface which is a surface opposite to the first surface; and wherein the virtual image light output from the image output unit enters the first optical element through the second surface of the refractive space, is reflected by the first optical element and then output through the second surface of the refractive space, and is then transferred to the second optical element.

In this case, the virtual image light output from the image output unit may be reflected by total internal reflection on a first surface of the optical means and enter the first optical element through the second surface of the refractive space, and the virtual image light reflected by the first optical element may be output toward the first surface of the optical means through the second surface of the refractive space, be reflected by total internal reflection on the first surface of the optical means, and be then transferred to the second optical element.

Furthermore, the first optical element may be a reflective means.

Furthermore, the first optical element may be formed of any one of a refractive optical element, a diffractive optical element (DOE), a holographic optical element (HOE), and a Fresnel mirror.

Furthermore, the first optical element may be formed in a bar shape extending to be disposed closer to the second optical element in the direction from the central portion thereof toward both left and right ends thereof when viewed from the front.

Furthermore, the inside of the refractive space may be empty.

Furthermore, the inside of the refractive space may be vacuous.

Furthermore, the inside of the refractive space may be filled with a medium having a refractive index different from that of the optical means.

Furthermore, the medium may be gas, liquid or solid having a refractive index different from that of the optical means.

Furthermore, the medium may be a phase-change material whose refractive index changes depending on at least any one of a voltage difference, and temperature and pressure conditions.

Furthermore, the virtual image light output from the image output unit may be refracted on the second surface of the refractive space, may be incident on the first optical element and reflected by the first optical element, and may then be refracted again on the second surface of the refractive space and output from the second surface of the refractive space.

Furthermore, the second surface of the refractive space may be formed as a flat surface.

Furthermore, the second surface of the refractive space may be formed as a curved surface.

Furthermore, the second surface of the refractive space may be formed convex with respect to the directions in which augmented reality image light enters and exits.

Furthermore, the second surface of the refractive space may be formed concave with respect to the directions in which augmented reality image light enters and exits.

Furthermore, the second surface of the refractive space may be formed as a free curved surface.

Furthermore, the second surface of the refractive space may be formed in the shape of a Fresnel lens.

Furthermore, the second surface of the refractive space may be formed of any one of a DOE and an HOE.

Furthermore, the second optical element may be composed of a plurality of optical modules.

Furthermore, the plurality of optical modules may each be arranged such that the virtual image light transferred from the first optical element is not blocked by other optical modules.

Furthermore, an auxiliary refractive space may be formed between the image output unit and the first optical element inside the optical means.

Furthermore, the auxiliary refractive space may be formed in the shape of any one of a convex lens and a concave lens when viewed from a side.

Furthermore, a surface of the auxiliary refractive space may be formed as a free curved surface.

Furthermore, the auxiliary refractive space may refract and then output the virtual image light output from the image output unit.

Furthermore, the inside of the auxiliary refractive space may be empty.

Furthermore, the inside of the auxiliary refractive space may be vacuous.

Furthermore, the inside of the refractive space may be filled with a medium having a refractive index different from that of the optical means.

Furthermore, the medium may be gas, liquid or solid having a refractive index different from that of the optical means.

Furthermore, the medium may be a phase-change material whose refractive index changes depending on at least any one of a voltage difference, and temperature and pressure conditions.

Advantageous Effects

According to the present invention, there may be provided the optical device for augmented reality capable of more precisely adjusting the performance of an optical system by forming the refractive space for refracting virtual image light inside the optical means.

In addition, according to the present invention, there may be provided the optical device for augmented reality capable of adjusting the focal length of a virtual image while providing a clearer virtual image by disposing the optical element serving as a collimator inside the optical means and also employing the optical element and the refractive space together.

BEST MODE

Embodiments according to the present invention will be described in detail below with reference to the accompanying drawings.

Figure 1:
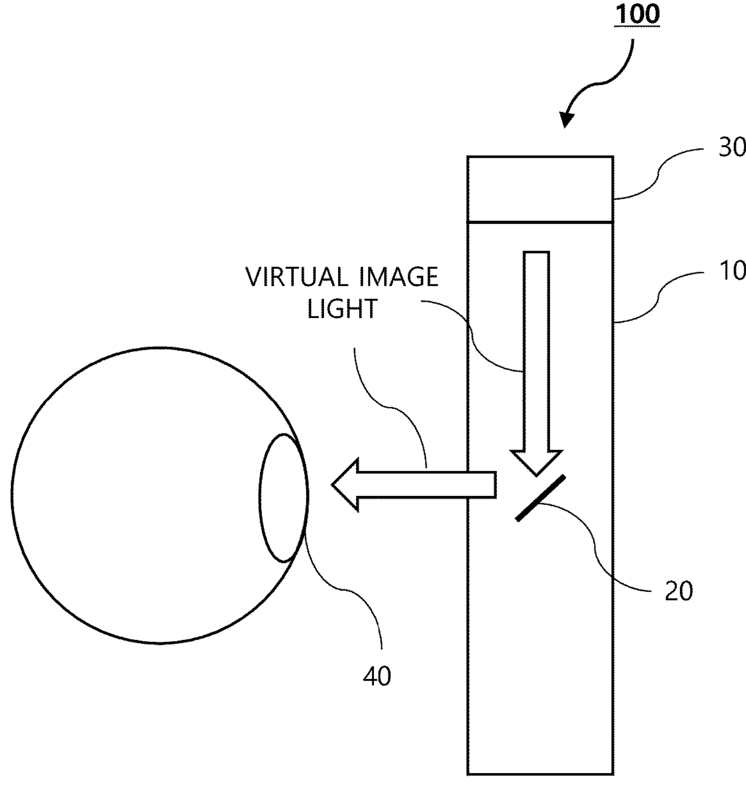
FIG. 1 is a diagram showing an optical device (100) for augmented reality as disclosed in prior art document 1.
Figure 2:
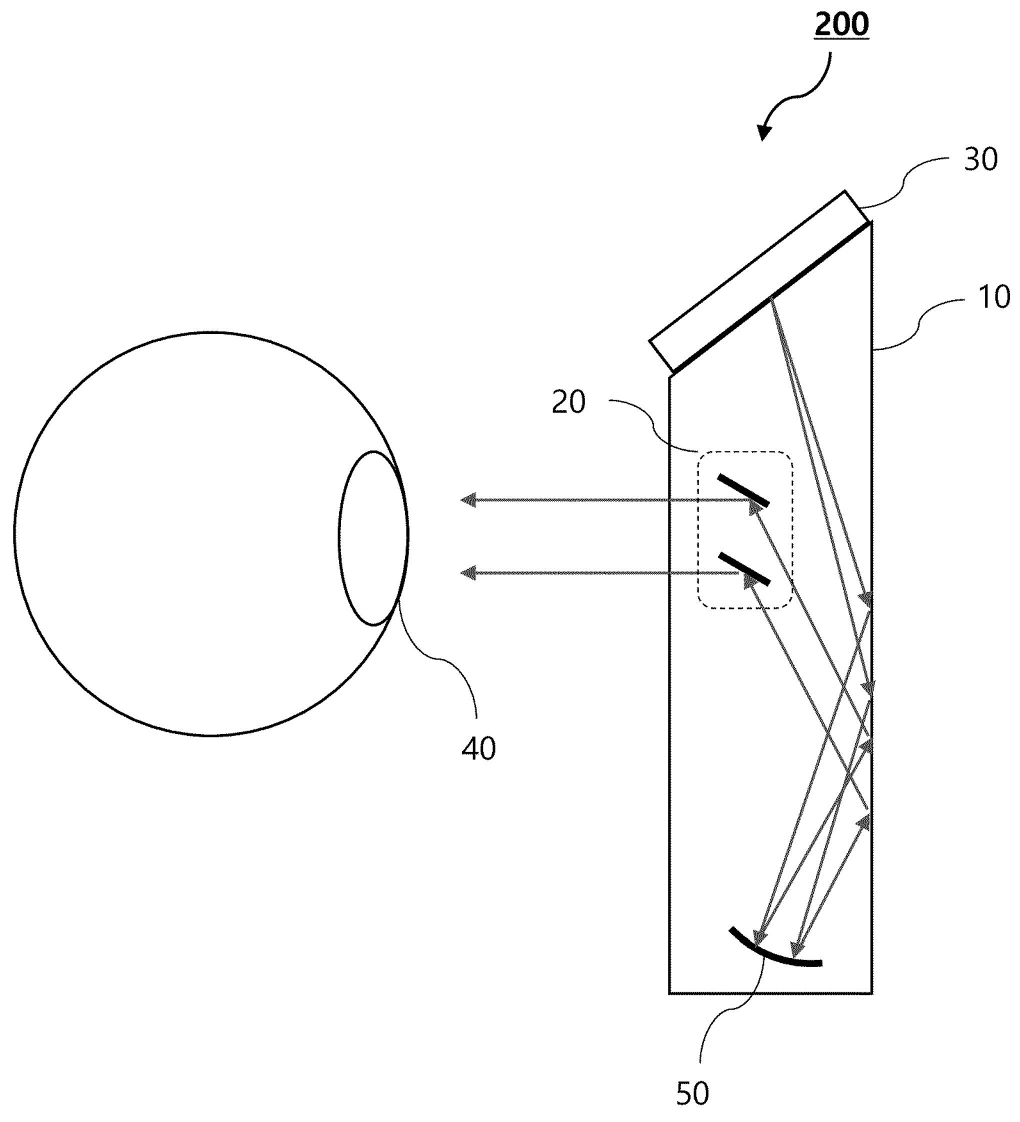
FIG. 2 is a diagram showing an optical device (200) for augmented reality as disclosed in prior art document 2.
Figure 3:
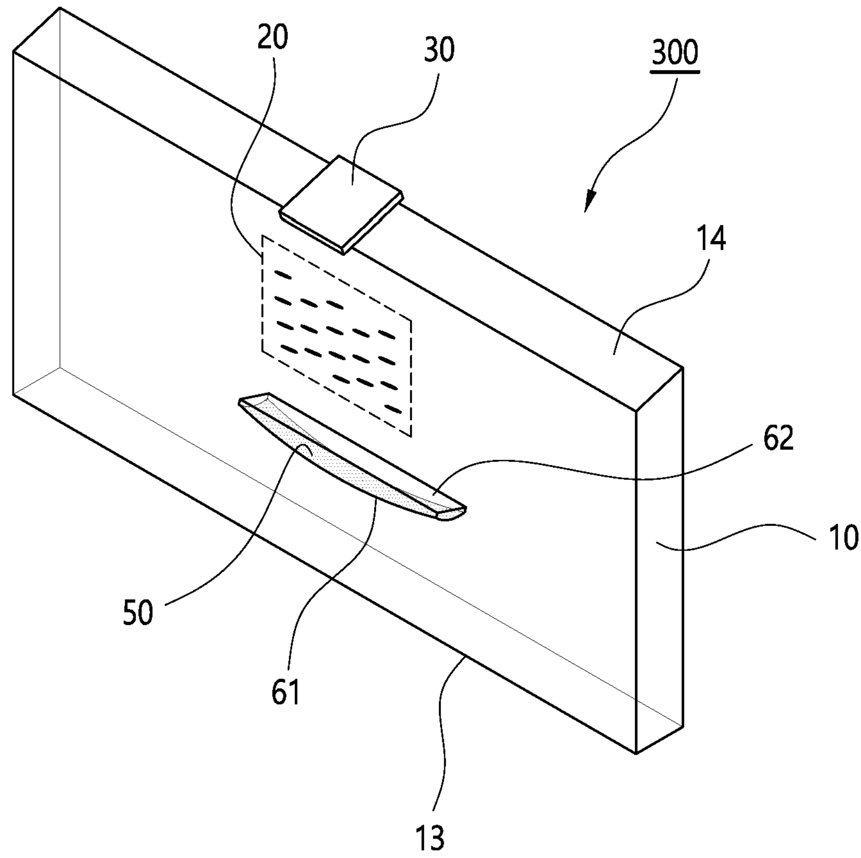
FIGS. 3 to 5 are diagrams illustrating an optical device (300) for augmented reality according to an embodiment of the present invention.
Figure 4:
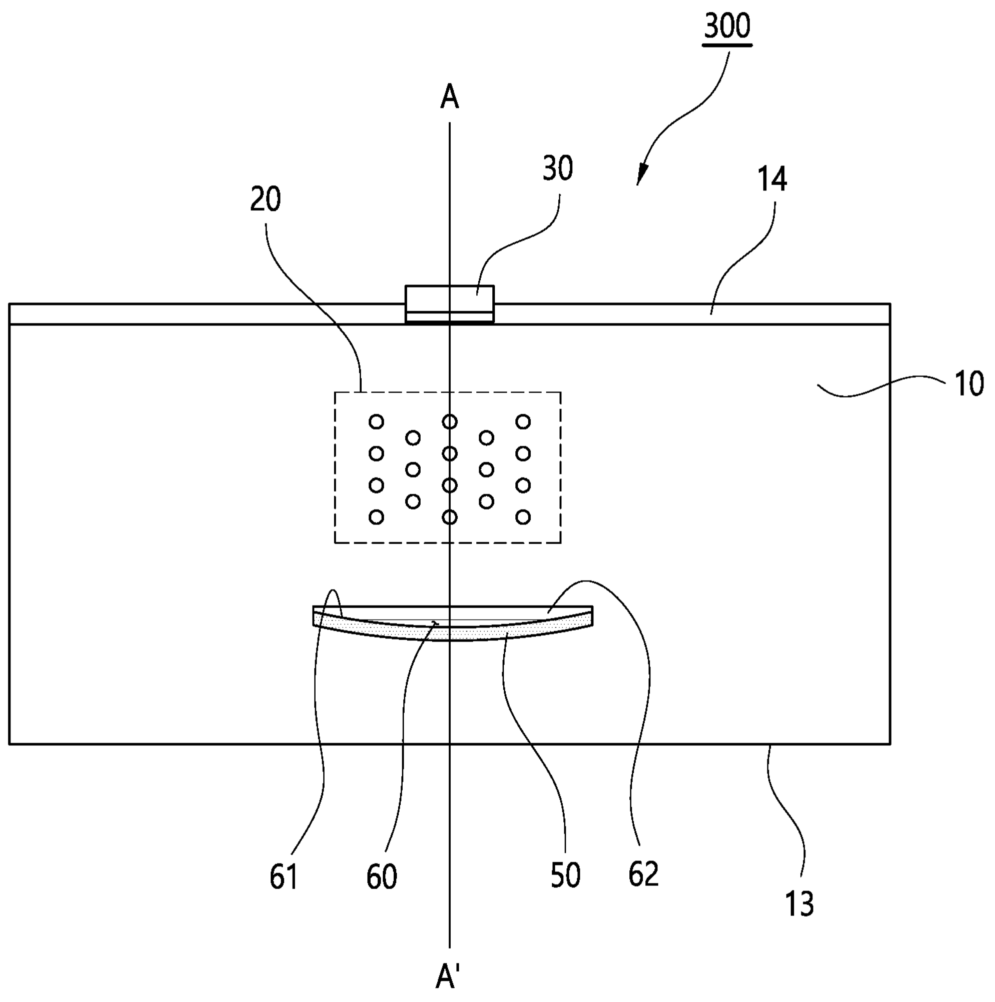
Figure 5:
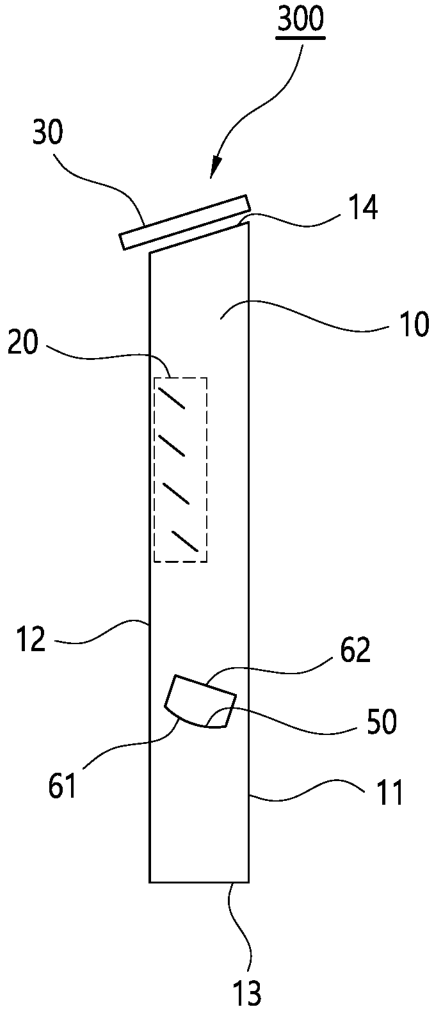

FIGS. 3 to 5 are diagrams illustrating an optical device 300 for augmented reality according to an embodiment of the present invention.

FIG. 3 is a perspective view, FIG. 4 is a front view, and FIG. 5 is a sectional view taken along line A-A' of FIG. 4.

Referring to FIGS. 3 to 5, the optical device 300 for augmented reality (hereinafter simply referred to as the "optical device 300") of the present embodiment includes a first optical element 50, a second optical element 20, an optical means 10, and a refractive space 60.

The first optical element 50 serves to transfer the virtual image light, output and transferred from an image output unit 30, to the second optical element 20.

In this case, the image output unit 30 is a means for displaying a virtual image and outputting virtual image light, which is image light corresponding to the virtual image. For example, the image output unit 30 may be a conventionally known micro-display device such as a small-sized LCD, OLED, or LCoS display device, or the like.

Figure 8:
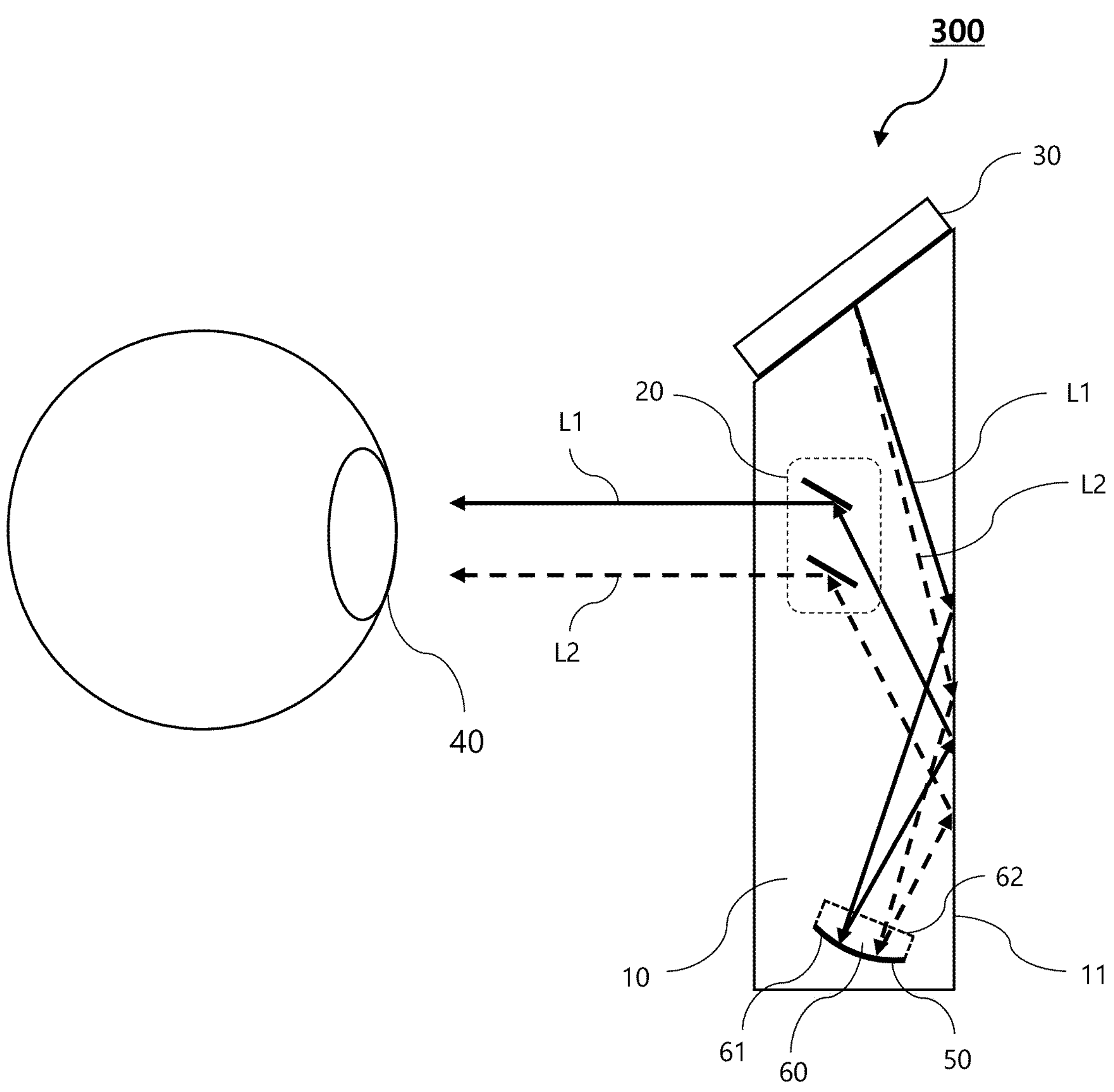
FIG. 8 shows overall optical paths in the optical device (300) for augmented reality.

The virtual image light output from the image output unit 30 is transferred to the first optical element 50 that is embedded inside the optical means 10. In this case, as shown in FIG. 8, the virtual image light output from the image output unit 30 is reflected by total internal reflection on the first surface 11 of the optical means 10 and then transferred to the first optical element 50.

However, this is an example. The virtual image light output from the image output unit 30 may be directly transferred to the first optical element 50 without undergoing total internal reflection on an inner surface of the optical means 10. Furthermore, it is obvious that the virtual image light may be reflected twice or more times by total internal reflection on at least one of the first and second surfaces 11 and 12 of the optical means 10 and then transferred to the first optical element 50.

Meanwhile, the image output unit 30 may further include an optical element composed of a combination of at least one of a reflective unit, a refractive unit, and a diffractive unit. In this case, the optical element reflects, refracts, or diffracts the virtual image light, output from the micro-display device, to the first optical element 50 of the optical means 10 by reflecting, refracting, or diffracting the virtual image light.

Although the image output unit 30 is shown as being disposed over the top surface 14 of the optical means 10 in FIGS. 3 to 5, this is an example. It is obvious that the image output unit 30 may be disposed at other locations.

Meanwhile, the first optical element 50 is embedded inside the optical means 10. In other words, the first optical element 50 is spaced apart from the first surface 11, second surface 12, third surface 13, and fourth surface 14 of the optical means 10, and is disposed in the inner space of the optical means 10.

In this case, the first surface 11 is defined as the surface on which real world image light is incident, and the second surface 12 is defined as the surface through which real world image light and virtual image light are output. Furthermore, the third surface 13 is the bottom surface of the optical means 10, and the fourth surface 14 is the top surface of the optical means 10 and is defined as the surface on which the virtual image light output from the image output unit 30 is incident.

In the optical device 300 of FIGS. 3 to 5, the first optical element 50 is embedded and disposed inside the optical means 10 to face the image output unit 30 with the second optical element 20 interposed therebetween. As shown in FIG. 8, the first optical element 50 transfers the incidental virtual image light, output from the image output unit 30 and reflected by total internal reflection on the first surface 11 of the optical means 10, to the second optical element 20 by outputting the virtual image light to the first surface 11 of the optical means 10.

However, this is an example. The first optical element 50 may be disposed at an appropriate location in the inner space of the optical means 10 by taking into consideration the relative locations and angles of the image output unit 30, the second optical element 20, and the pupil 40 so that the first optical element 50 can transfer the virtual image light, output from the image output unit 30, to the second optical element 20.

Meanwhile, as shown in FIG. 4 when viewed from the front, the first optical element 50 may extend to be disposed closer to the second optical element 20 in the direction from the central portion thereof toward both left and right ends thereof, and may be formed in the shape of a gently "U" shaped bar as a whole.

Furthermore, as shown in FIG. 4, the length of the first optical element 50 in the lateral direction is formed to correspond to the length of the second optical element 20 in the lateral direction when viewed from the front. The reason for this is to enable the first optical element 50 to better perform its function as a collimator to be described later.

Furthermore, the surface of the first optical element 50 is preferably formed as a curved surface.

For example, as shown in FIG. 5, the surface of the first optical element 50 may be formed concave with respect to the direction in which the virtual image light is incident. The reason for this is to also enable the first optical element 50 to better perform its function as a collimator to be described later.

Meanwhile, the length of the first optical element 50 in the widthwise direction may be formed within an appropriate range by taking into consideration factors such as a ghost image, an optical path, optical performance, and form factors. In this case, the length of the first optical element 50 in the widthwise direction refers to the length between both ends of the first optical element 50 when the optical device 300 is viewed from a side, as shown in FIG. 5.

Meanwhile, it is preferable that the first optical element 50 be a reflective means capable of reflecting and outputting incident virtual image light. For example, the first optical element 50 may be made of a material having a high reflectance of 100% or close to 100%, such as a metal material.

Furthermore, the first optical element 50 may be formed of a means such as a half mirror that partially reflects and partially transmits light.

Alternatively, the first optical element 50 may be formed of any one of a refractive optical element, a Diffractive Optical Element (DOE), a Holographic Optical Element (HOE), and a Fresnel mirror.

Alternatively, the first optical element 50 may be formed of an optical element such as a notch filter that selectively transmits light therethrough according to the wavelength thereof.

Furthermore, the surface of the first optical element 50 that is opposite to the surface of the first optical element 50 on which the virtual image light is incident and through which the virtual image light is output may be coated with an absorbing material that absorbs light.

Meanwhile, a refractive space 60 is formed inside the optical means 10, and the first optical element 50 is disposed inside the refractive space 60.

Furthermore, as shown in FIGS. 3 to 5, the first optical element 50 may be inclined such that the surface thereof faces the first surface 11 of the optical means 10.

Figure 6:
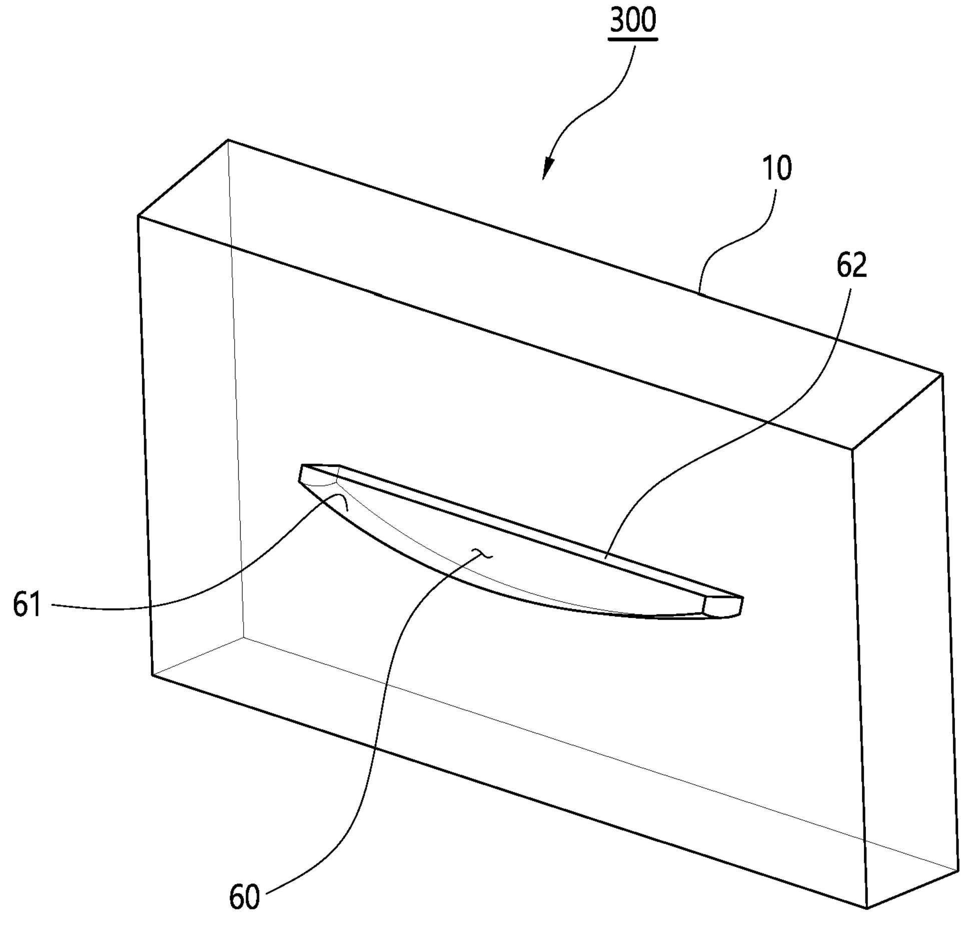
FIG. 6 is a diagram illustrating a refractive space (60)

FIG. 6 is a diagram illustrating the refractive space 60, which shows only the optical means 10 and the refractive space 60.

As shown in FIG. 6, the refractive space 60 is formed inside the optical means 10, and has a first surface 61 on which the first optical element 50 is disposed and a second surface 62 which is opposite to the first surface 61.

As shown in the drawing, it is preferable that the ends of the first surface 61 and the ends of the second surface 62 be spaced apart from each other to have a slight gap therebetween. However, this is an example. It is obvious that the ends of the first surface 61 and the ends of the second surface 62 may be formed to come into contact each other.

The refractive space 60 is formed inside the optical means 10 when the optical means 10 is manufactured, so that the first surface 61 and the second surface 62 are made of the same material as the optical means 10.

Furthermore, the first optical element 50 is disposed on the first surface 61, so that the first surface 61 has a shape and size corresponding to the shape and size of the first optical element 50.

In FIGS. 3 to 5, the first optical element 50 has a gentle "U" shape when viewed from the front. Accordingly, the first surface 61 also has a gentle "U" shape corresponding to the shape of the first optical element 50 when viewed from the front.

The location of the refractive space 60 is determined depending on the location at which the first optical element 50 is to be disposed. It is preferable to, after determining the location of the first optical element 50, form the refractive space 60 at the location.

The second surface 62 of the refracting space 60 acts as the surface through which virtual image light enters and exits.

For example, as shown in FIG. 8, the virtual image light output from the image output unit 30 is reflected by total internal reflection on the first surface 11 of the optical means 10 and directed to the second surface 62 of the refractive space 60, and then enters the first optical element 50 through the second surface 62 of the refractive space 60. Furthermore, the virtual image light reflected by the first optical element 50 is output through the second surface 62 of the refractive space 60, reflected by total internal reflection on the first surface 11 of the optical means 10, and then transferred to the second optical element 20.

In FIG. 6, the second surface 62 of the refractive space 60 is formed as a flat surface. However, this is an example. As will be described later, the surface of the second surface 62 may be formed as a curved surface such as a convex surface or a concave surface.

Meanwhile, the inside of the refractive space 60 may be formed as an empty space.

Furthermore, the inside of the refractive space 60 may be filled with a medium having a refractive index different from that of the optical means 10.

When the optical means 10 is made of glass or plastic material, the refractive index thereof is around 1.5, and thus the refractive space 60 may be filled with a medium having a refractive index different from this value.

For example, the refractive space 60 may be filled with air having a refractive index of about 1.0003 or gases other than air having a value close to 1.

Alternatively, the refractive index of vacuum is 1, and thus it may also be possible to make the refractive space 60 a vacuum state.

Meanwhile, a liquid may be used as the medium. For example, water has a refractive index of about 1.33, and thus the inside of the optical means 10 may be filled with water. Alternatively, other liquids having a refractive index different from that of the optical means 10 may be used as the medium with which the inside of the refractive space 60 is filled.

Alternatively, a solid having a refractive index different from that of the optical means 10 may be used as the medium.

Alternatively, various other materials having a refractive index different from that of the optical means 10 may be used as the medium.

Meanwhile, the inside of the refractive space 60 may be filled with a phase-change material whose refractive index changes depending on at least one of conditions including a voltage difference, temperature, and pressure.

For example, a phase-change material used in hologram memory or an optical storage device has a characteristic in which a refractive index changes depending on a condition such as temperature or pressure during crystallization after the application of energy.

Representative materials used in optical storage devices include Sb2Se3, Ge2Sb2Te5, and TeOx ($0<x<2$) represented by GeSbTe (GST). After being heated to a high temperature using a laser, these materials change into an amorphous phase when cooled rapidly, and change into a crystalline phase when cooled slowly. In this case, a difference in refractive index between the crystalline phase and the amorphous phase occurs.

Representative materials used in hologram memory and the like include acrylate-based copolymers, and the refractive indices thereof are changed by exposure through a laser.

The refractive space 60 may be filled with these phase-change material, and then a refractive condition on the second surface 62 of the refractive space 60 may be adjusted by a difference in refractive index between the metamaterial and the optical means 10 by using a change in refractive index according to the condition of the phase-change material.

Furthermore, other metamaterials whose refractive indices can be changed by an electrical or chemical method may each be used as the medium.

Meanwhile, the medium with which the refractive space 60 is filled is preferably made of a transparent or translucent material.

As described above, the refractive space 60 is filled with a medium having a refractive index different from that of the optical means 10, so that the virtual image light passing through the second surface 62 is refracted on the second surface 62 and then enters or exits.

In other words, the virtual image light entering the first optical element 50 is refracted on the second surface 62 of the refracting space 60, and the virtual image light exiting the first optical element 50 is refracted again on the second surface 62 and then output.

Figure 7:
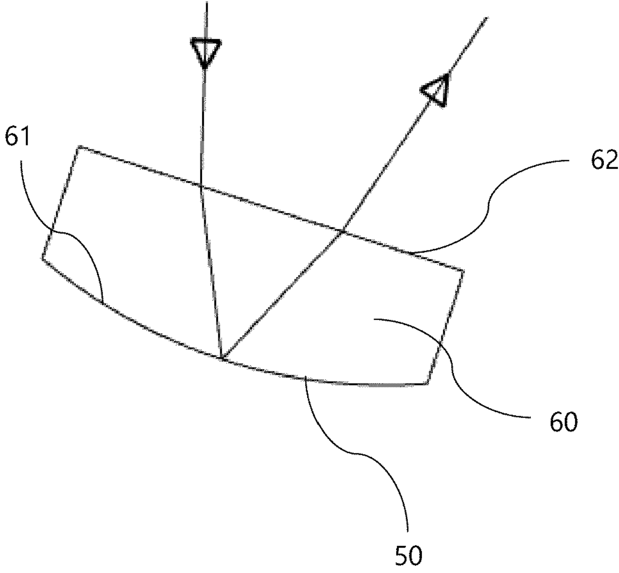
FIG. 7 is a diagram illustrating an optical path in the refractive space (60) and a first optical element (50)

FIG. 7 is a diagram illustrating an optical path in the refractive space 60 and the first optical element 50, which shows a sectional view taken along line A-A' of FIG. 4.

Referring to FIG. 7, virtual image light passes through the second surface 62 of the refractive space 60. In this case, the virtual image light enters the first optical element 50 after being refracted due to a difference in refractive index between the optical means 10 and the refractive space 60.

In FIG. 7, it is assumed that the refractive index of the medium is lower than that of the optical means 10, so that the virtual image light has a refraction angle larger than an incident angle.

The virtual image light is reflected from the first optical element 50, passed through the second surface 62, and then output to the outside. In this case, the virtual image light has a refraction angle smaller than an incident angle.

Accordingly, the refractive space 60, more specifically the second surface 62, serves as a collimator for collimating the virtual image light output and transferred from the image output unit 30 and then outputting it as parallel light in association with the first optical element 50.

In other words, by appropriately combining the refractive index of the medium filled in the refractive space 60 and the characteristic of the surface shape of the first optical element 50, the virtual image light output from any one point of the image output unit 30 may be transferred to the second optical element 20 as collimated parallel light.

FIG. 8 shows overall optical paths in the optical device 300 for augmented reality.

FIG. 8 is the same as the sectional view of FIG. 5, except that the optical paths of virtual image lights in a refractive space 60 and a first optical element 50 are shown and only two of a plurality of optical modules constituting the second optical element 20 are shown for convenience of description.

Although in FIG. 8, the virtual image lights in the refractive space 60 are shown as straight lines as if they are not refracted when passing through the second surface 62, these are briefly shown for convenience of illustration. It should be noted that in practice, they are refracted as illustrated in FIG. 7.

Referring to FIG. 8, the virtual image lights L1 and L2 output from any one point of the image output unit 30 are reflected by total internal reflection on the first surface 11 of the optical means 10, and are incident on the second surface 62 of the refractive space 60.

The refractive space 60 has a refractive index different from that of the optical means 10. Accordingly, as shown in FIG. 7, the virtual image lights L1 and L2 incident on the second surface 62 are refracted on the second surface 62 and then enter the first optical element 50.

The virtual image lights L1 and L2 incident on the first optical element 50 are reflected by the first optical element 50 and then output toward the second surface 62. Thereafter, the virtual image lights L1 and L2 are refracted again on the second surface 62 and then output toward the first surface 11 of the optical means 10, as illustrated in FIG. 7. In this case, the output virtual image lights L1 and L2 become parallel lights that are collimated by the refractive space 60 and the first optical element 50, as described above.

The virtual image lights L1 and L2 reflected again by total internal reflection on the first surface 11 of the optical means 10 are transferred to the second optical element 20. Then, the second optical element 20 transfers the incident virtual image lights L1 and L2 toward the pupil 40 of an eye of a user.

Accordingly, it can be seen that the virtual image lights L1 and L2 output from one point of the image output unit 30 are transferred to the pupil 40 of the user in the form of parallel lights.

As described above, the case of using the first optical element 50 and the refractive space 60 together to perform the function of a collimator may improve design freedom and convenience, increase the tolerance range required in an optical system, and more precisely adjust the performance of the optical system, compared to the case of using only the first optical element 50 as a collimator.

Meanwhile, although the second surface 62 of the refractive space 60 is shown as being flat in the above embodiment, this is an example. The second surface 62 may also be formed as a curved surface or other shapes.

Figure 9:
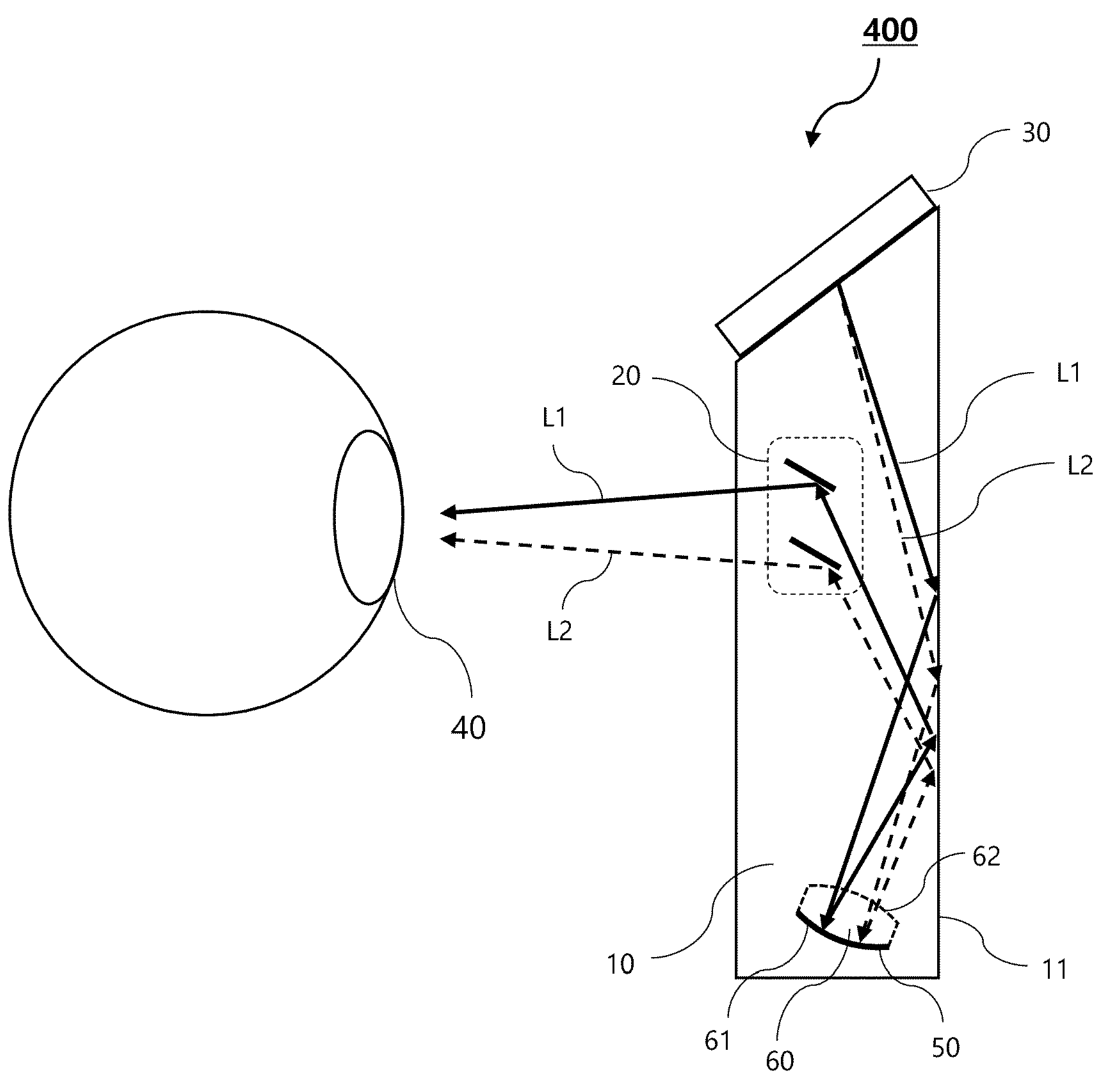
FIG. 9 is a sectional view of an optical device (400) according to another embodiment of the present invention.

FIG. 9 is a sectional view of an optical device 400 according to another embodiment of the present invention.

The embodiment of FIG. 9 is the same as the optical device 300 of the embodiment described with reference to FIGS. 3 to 8, except that the second surface 62 of a refractive space 60 is formed convex with respect to the directions in which virtual image lights L1 and L2 enter and exit.

Accordingly, the refraction angles at which the virtual image lights L1 and L2 pass through the second surface 62 of the refractive space 60 are different from those in the above-described embodiment.

Although in FIG. 9, the virtual image lights in the refractive space 60 are also shown as straight lines as if they are not refracted when passing through the second surface 62, these are briefly shown for convenience of illustration. It should be noted that in practice, they are refracted as illustrated in FIG. 10.

Figure 10:
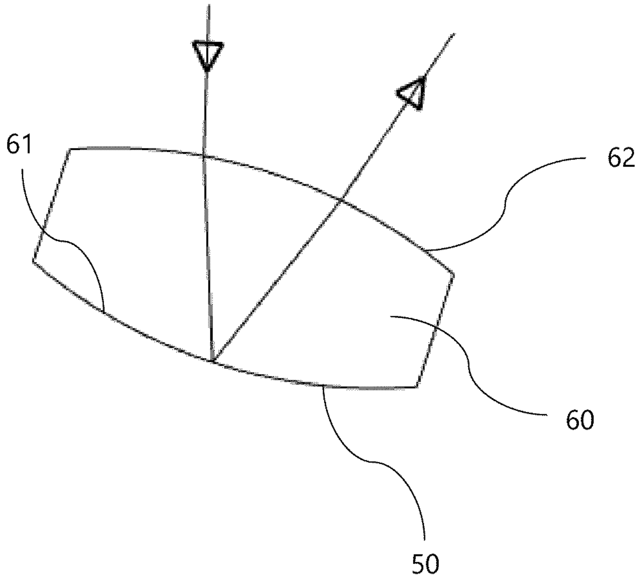
FIG. 10 is a diagram illustrating an optical path in the refractive space (60) and first optical element (50) of the optical device (400) of FIG. 9.

FIG. 10 is a diagram illustrating an optical path in the refractive space 60 and first optical element 50 of the optical device 400 of FIG. 9, which shows a sectional view taken along line A-A' of FIG. 4.

As shown in FIG. 10, when virtual image light is incident on the second surface 62 of the refractive space 60, the virtual image light is refracted due to the difference in refractive index between the optical means 10 and the refractive space 60, as described above. Since the second surface 62 is formed as a convex surface, the refraction angle thereof becomes smaller than that of FIG. 7.

Meanwhile, the virtual image light reflected by the first optical element 50 passes through the second surface 62 and is output to the outside. In this case, the refraction angle of the virtual image light has a smaller value than that of FIG. 7.

Accordingly, as shown in FIG. 9, the virtual image lights L1 and L2 refracted on and output from the second surface 62 of the refractive space 60 are reflected by total internal reflection on the first surface 11 of the optical means 10, and is transferred to the pupil 40 of an eye of a user through the second optical element 20. In this case, the virtual image lights L1 and L2 transferred to the pupil 40 of the eye of the user have a shape converging toward the central axis of the pupil 40 rather than the shape of parallel light.

Using this feature, the first optical element 50 and the refractive space 60 may be used together to perform the function of a collimator. Accordingly, the optical path of a virtual image output from the image output unit 30 may be more precisely adjusted.

Figure 11:
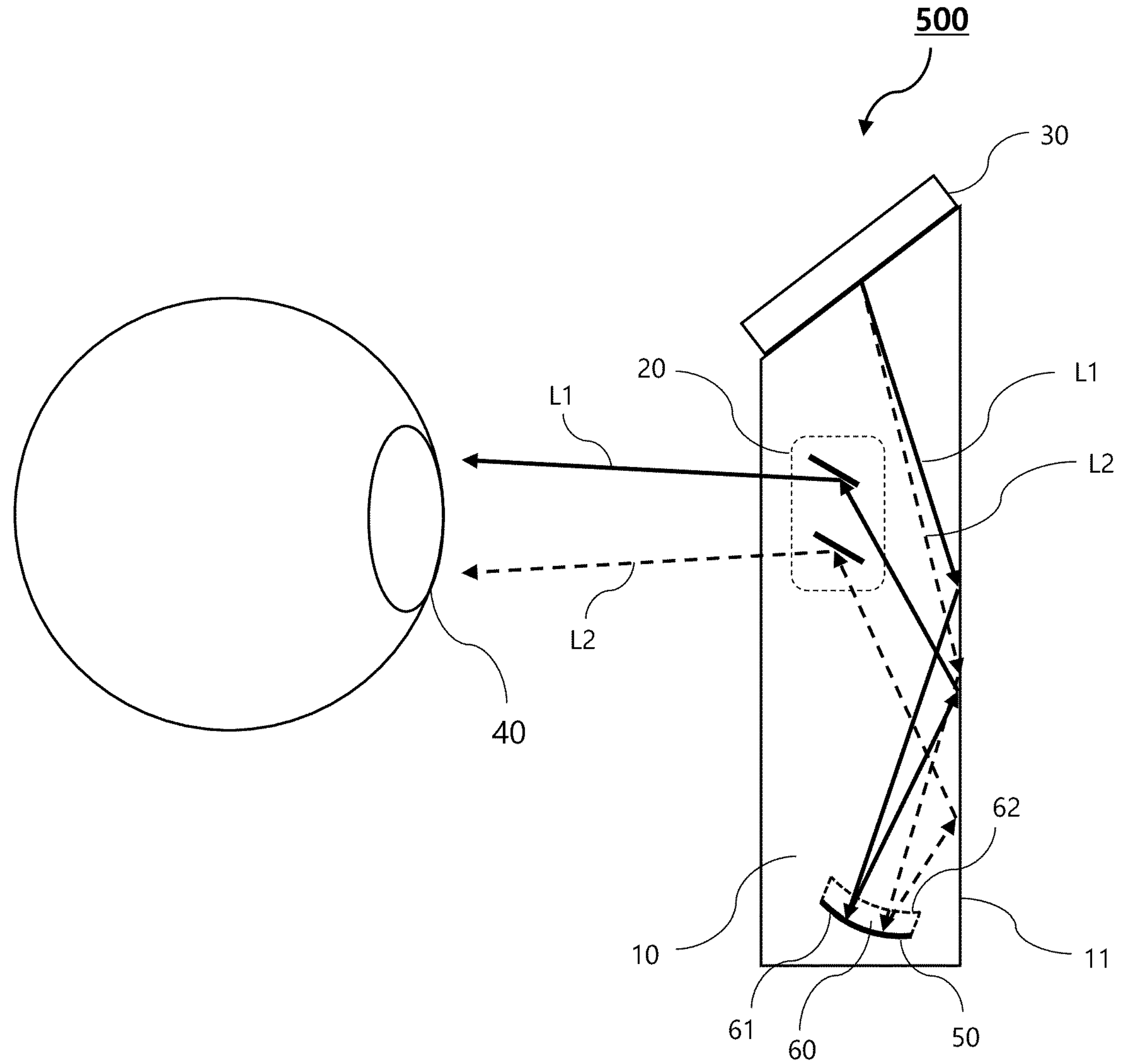
FIG. 11 is a sectional view of an optical device (500) according to still another embodiment of the present invention.

FIG. 11 is a sectional view of an optical device 500 according to still another embodiment of the present invention.

The embodiment of FIG. 11 is also the same as the optical device 300 of the embodiment described with reference to FIGS. 3 to 8, except that the second surface 62 of a refractive space 60 is formed concave with respect to the directions in which virtual image lights L1 and L2 enter and exit.

Although in FIG. 11, the virtual image lights in the refractive space 60 are also shown as straight lines as if they are not refracted when passing through the second surface 62, these are briefly shown for convenience of illustration. It should be noted that in practice, they are refracted as illustrated in FIG. 12.

Figure 12:
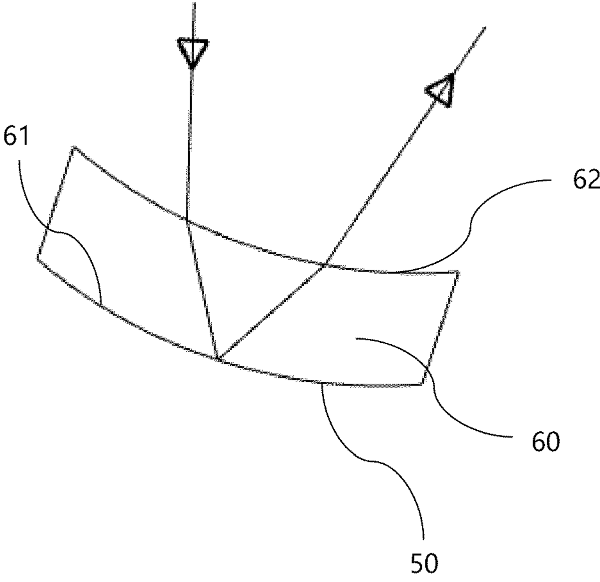
FIG. 12 is a diagram illustrating an optical path in the refractive space (60) and first optical element (50) of the optical device (500) of FIG. 11.

FIG. 12 is a diagram illustrating an optical path in the refractive space 60 and first optical element 50 of the optical device 500 of FIG. 11, which shows a sectional view taken along line A-A' of FIG. 4.

As shown in FIG. 12, when virtual image light is incident on the second surface 62 of the refractive space 60, the virtual image light is refracted due to the difference in refractive index between the optical means 10 and the refractive space 60, as described above. Since the second surface 62 is formed as a concave surface, the refraction angle thereof becomes larger than that of FIG. 7.

Meanwhile, the virtual image light reflected by the first optical element 50 passes through the second surface 62 again and is output toward the first surface 11 of the optical means 10. In this case, the refraction angle of the virtual image light has a larger value than that of FIG. 7.

Accordingly, as shown in FIG. 11, the virtual image lights L1 and L2 refracted on and output from the second surface 62 of the refractive space 60 are reflected by total internal reflection on the first surface 11 of the optical means 10, and is transferred to the pupil 40 of an eye of a user through the second optical element 20. In this case, the virtual image lights L1 and L2 transferred to the pupil 40 of the eye of the user have a shape diverging outward from the central axis of the pupil 40 rather than the shape of parallel light.

Using this feature, the first optical element 50 and the refractive space 60 may be used together to perform the function of a collimator. Accordingly, the optical path of a virtual image output from the image output unit 30 may be more precisely adjusted.

Meanwhile, the second surface 62 of the refractive space 60 may be formed as a free curved surface. In this case, the free curved surface may be a curved surface including at least one of a concave surface and a convex surface. Furthermore, the free curved surface may be a curved surface having a non-rotationally symmetrical shape rather than a rotationally symmetrical shape. Moreover, the free curved surface may be any surface having asymmetry about any axis, unlike a spherical surface or a rotationally symmetric aspherical surface.

Meanwhile, the second surface 62 of the refractive space 60 may be formed in the shape of a Fresnel lens.

In addition, the second surface 62 of the refractive space 60 may be formed as any one of a DOE and an HOE.

Next, the second optical element 20 will be described.

The second optical element 20 serves to transfer the virtual image light, transferred from the first optical element 50, toward the pupil 40 of an eye of a user.

The second optical element 20 is also embedded inside the optical means 10. In other words, the second optical element 20 is spaced apart from the first surface 11, second surface 12, third surface 13, and fourth surface 14 of the optical means 10 and is disposed in the inner space of the optical means 10. The second optical element 20 transfers the virtual image light, transferred from the first optical element 50, toward the pupil 40 of the eye of the user.

The second optical element 20 may be composed of a plurality of optical modules that are arranged in a matrix form when viewed from the front, as shown in FIGS. 3 to 5, in order to increase the field of view. In the present specification, the second optical element 20 collectively refers to the plurality of optical modules.

In the optical device 300 of FIGS. 3 to 5, the virtual image light output from the first optical element 50 is output toward the first surface 11 of the optical means 10, reflected again by total internal reflection on the first surface 11 of the optical means 10, and then transferred to the second optical element 20, as described above.

As described above, the virtual image light output from the image output unit 30 is transferred to the second optical element 20 via the first optical element 50 and the first surface 11 of the optical means 10. Accordingly, the optical modules constituting the second optical element 20 are each arranged to have an appropriate inclination angle with respect to the second surface 12 of the optical means 10 by taking into consideration the above light path.

Meanwhile, it is preferable that the second optical element 20 be a reflective unit that reflects incident virtual image light and outputs it to the pupil 40. For example, the second optical element 20 may be made of a material having a high reflectance of 100% or close to 100%, such as a metal material.

Furthermore, the second optical element 20 may be formed of a means such as a half mirror that partially reflects and partially transmits light.

Alternatively, the second optical element 20 may be formed of any one of a refractive optical element, a DOE, and an HOE.

Alternatively, the second optical element 20 may be formed of an optical element such as a notch filter that selectively transmits light therethrough according to the wavelength thereof.

Meanwhile, as described above, it is preferable that each of the plurality of optical modules constituting the second optical element 20 be formed to have a size smaller than the size of a human pupil, i.e., 8 mm or less, more preferably 4 mm or less, in order to achieve a pinhole effect by increasing the depth of field.

By this, the depth of field for the light incident onto the pupil 40 may be made almost infinite, i.e., considerably deep, by the optical modules. Therefore, there may be achieved a pinhole effect that allows an image for augmented reality to be always recognized as being in focus regardless of a change in the focal length even when a user changes the focal length for the real world while gazing at the real world.

In this case, the size of each of the optical modules is defined as the maximum length between any two points on the edge boundary line of each optical module.

Alternatively, the size of each of the optical modules may be the maximum length between any two points on the edge boundary of an orthographic projection obtained by projecting each optical module onto a plane that is perpendicular to a straight line between the pupil 40 and the optical modules and includes the center of the pupil 40.

Meanwhile, when the size of the optical modules is excessively small, a diffraction phenomenon increases, so that the size of the optical modules is preferably larger than, e.g., 0.3 mm.

Furthermore, the shape of each of the optical modules may be circular.

In addition, the optical modules may be formed in an elliptical shape so that the optical modules appear circular when viewed from the pupil 40.

Meanwhile, each of the plurality of optical modules is disposed such that the virtual image light transferred from the first optical element 50 is not blocked by other optical modules. To this end, as shown in FIG. 5, it is preferable that the plurality of optical modules be arranged in the form of an oblique or gently curved line rather than a vertical straight line when the optical device 300 is viewed from a side.

Next, the optical means 10 will be described.

In the optical means 10 are embedded and disposed the first optical element 50 and the second optical element 20. The optical means 10 serves to transfer real world image light, transferred from the real world, to the pupil 40 of the eye of the user by transmitting it therethrough, and to transfer the virtual image light, transferred from the second optical element 20, to the pupil 40 of the eye of the user, as described above.

Furthermore, as described above, the refractive space 60 is formed inside the optical means 10, and the first optical element 50 is disposed on the first surface 61 of the refractive space 60.

Figure 13:
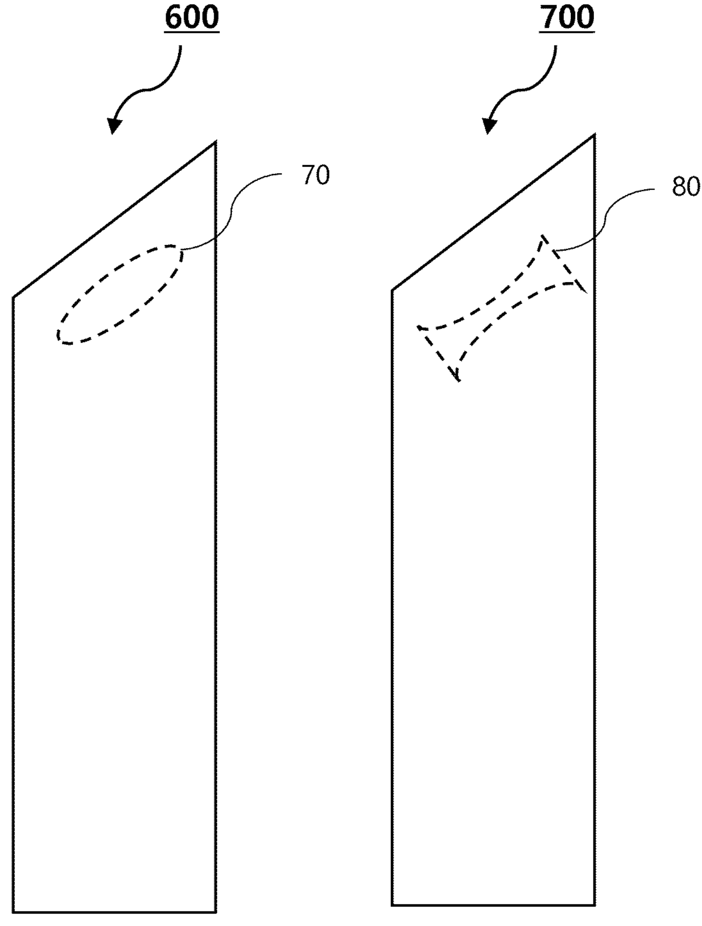
FIG. 13 is a view showing optical devices (600 and 700) according to still further embodiments of the present invention.

FIG. 13 is a side view showing optical devices 600 and 700 according to still further embodiments of the present invention.

The optical devices 600 and 700 of FIG. 13 are the same as the above-described embodiments, except that the optical devices 600 and 700 further include an auxiliary refractive space 70 or 80 disposed between an image output unit 30 and a first optical element 50.

The auxiliary refractive space 70 or 80 of FIG. 13 may be applied to all the above-described embodiments. Other components are omitted because they are the same as those of the above-described embodiments, and only the auxiliary refractive spaces 70 and 80 are illustrated.

When viewed from a side, the auxiliary refractive spaces 70 and 80 may have the same shape as the convex lens shown on the left or the concave lens shown on the right. The auxiliary refractive spaces 70 and 80 refract and output the virtual image light output from the image output unit 30.

These auxiliary refractive spaces 70 and 80 may refract and output incident virtual image light. As described above, when the auxiliary refractive space 70 or 80 is employed together with the first optical element 50 and the refractive space 60, there is an advantage in that the performance of the optical system can be more precisely adjusted.

Meanwhile, surfaces of the auxiliary refractive spaces 70 and 80 may also be formed as free curved surfaces.

In addition, the insides of the auxiliary refractive spaces 70 and 80 may each be formed as an empty space like the inside of the above-described refractive space 60.

Alternatively, the insides of the auxiliary refractive spaces 70 and 80 may each be filled with a medium having a refractive index different from that of the optical means 10.

Alternatively, the insides of the auxiliary refractive spaces 70 and 80 may each be made to be a vacuum state.

Meanwhile, as the medium filled in the auxiliary refractive spaces 70 and 80, there may be used various other materials such as liquid, gas, and solid having a refractive index different from that of the optical means 10.

Meanwhile, the insides of the auxiliary refractive spaces 70 and 80 may each be filled with a phase-change material whose refractive index changes depending on at least one of conditions such as a voltage difference, temperature, and pressure. Furthermore, other metamaterials whose refractive indices can be changed by an electrical or chemical method may each be used as the medium with which the secondary refractive spaces 70 and 80 are each filled.

Meanwhile, the medium with which the auxiliary refractive spaces 70 and 80 are each filled is preferably made of a transparent or translucent material.

While the preferred embodiments according to the present invention have been described above, the present invention is not limited to the above embodiments. It should be noted that various modifications and variations may be possible within the scope of the present invention as defined by the appended claims.

The invention claimed is:

1. An optical device for augmented reality having a refractive space, the optical device comprising:

a first optical element configured to transfer virtual image light, output and transferred from an image output unit, to a second optical element;

the second optical element configured to transfer the virtual image light, transferred from the first optical element, toward a pupil of an eye of a user;

an optical means configured such that the first optical element and the second optical element are embedded and disposed therein; and the refractive space, the refractive space being formed inside the optical means;

wherein the refractive space has a first surface on which the first optical element is disposed, and a second surface which is a surface opposite to the first surface;

wherein the virtual image light output from the image output unit enters the first optical element through the second surface of the refractive space, is reflected by the first optical element and then output through the second surface of the refractive space, and is then transferred to the second optical element;

wherein the second optical element is composed of a plurality of optical modules; and wherein the plurality of optical modules are each arranged such that the virtual image light transferred from the first optical element is not blocked by other optical modules.

2. The optical device of claim 1, wherein the first optical element is a reflective means.

3. The optical device of claim 1, wherein the first optical element is formed of any one of a refractive optical element, a diffractive optical element (DOE), a holographic optical element (HOE), and a Fresnel mirror.

4. The optical device of claim 1, wherein the first optical element is formed in a bar shape extending to be disposed closer to the second optical element in a direction from a central portion thereof toward both left and right ends thereof when viewed from a front.

5. The optical device of claim 1, wherein an inside of the refractive space is empty.

6. The optical device of claim 1, wherein an inside of the refractive space is filled with a medium having a refractive index different from that of the optical means.

7. The optical device of claim 6, wherein the medium is gas, liquid or solid having a refractive index different from that of the optical means.

8. The optical device of claim 6, wherein the medium is a phase-change material whose refractive index changes depending on at least any one of a voltage difference, and temperature and pressure conditions.

9. The optical device of claim 1, wherein the virtual image light output from the image output unit is refracted on the second surface of the refractive space, is incident on the first optical element and reflected by the first optical element, and is then refracted again on the second surface of the refractive space and output from the second surface of the refractive space.

10. The optical device of claim 1, wherein the second surface of the refractive space is formed as a flat surface.

11. An optical device for augmented reality having a refractive space, the optical device comprising:

a first optical element configured to transfer virtual image light, output and transferred from an image output unit, to a second optical element;

the second optical element configured to transfer the virtual image light, transferred from the first optical element, toward a pupil of an eye of a user;

an optical means configured such that the first optical element and the second optical element are embedded and disposed therein; and the refractive space, the refractive space being formed inside the optical means;

wherein the refractive space has a first surface on which the first optical element is disposed, and a second surface which is a surface opposite to the first surface;

wherein the virtual image light output from the image output unit enters the first optical element through the second surface of the refractive space, is reflected by the first optical element and then output through the second surface of the refractive space, and is then transferred to the second optical element;

wherein the virtual image light output from the image output unit is reflected by total internal reflection on the first surface of the optical means and enters the first optical element through the second surface of the refractive space; and wherein the virtual image light reflected by the first optical element is output toward the first surface of the optical means through the second surface of the refractive space, is reflected by total internal reflection on the first surface of the optical means, and is then transferred to the second optical element.

12. An optical device for augmented reality having a refractive space, the optical device comprising:

a first optical element configured to transfer virtual image light, output and transferred from an image output unit, to a second optical element;

the second optical element configured to transfer the virtual image light, transferred from the first optical element, toward a pupil of an eye of a user;

an optical means configured such that the first optical element and the second optical element are embedded and disposed therein; and the refractive space, the refractive space being formed inside the optical means;

wherein the refractive space has a first surface on which the first optical element is disposed, and a second surface which is a surface opposite to the first surface;

wherein the virtual image light output from the image output unit enters the first optical element through the second surface of the refractive space, is reflected by the first optical element and then output through the second surface of the refractive space, and is then transferred to the second optical element; and wherein an inside of the refractive space is vacuous.

13. An optical device for augmented reality having a refractive space, the optical device comprising:

a first optical element configured to transfer virtual image light, output and transferred from an image output unit, to a second optical element;

the second optical element configured to transfer the virtual image light, transferred from the first optical element, toward a pupil of an eye of a user;

an optical means configured such that the first optical element and the second optical element are embedded and disposed therein; and the refractive space, the refractive space being formed inside the optical means;

wherein the refractive space has a first surface on which the first optical element is disposed, and a second surface which is a surface opposite to the first surface;

wherein the virtual image light output from the image output unit enters the first optical element through the second surface of the refractive space, is reflected by the first optical element and then output through the second surface of the refractive space, and is then transferred to the second optical element; and wherein the second surface of the refractive space is formed as a curved surface.

14. The optical device of claim 13, wherein the second surface of the refractive space is formed convex with respect to directions in which augmented reality image light enters and exits.

15. The optical device of claim 13, wherein the second surface of the refractive space is formed concave with respect to directions in which augmented reality image light enters and exits.

16. An optical device for augmented reality having a refractive space, the optical device comprising:

a first optical element configured to transfer virtual image light, output and transferred from an image output unit, to a second optical element;

the second optical element configured to transfer the virtual image light, transferred from the first optical element, toward a pupil of an eye of a user;

an optical means configured such that the first optical element and the second optical element are embedded and disposed therein; and the refractive space, the refractive space being formed inside the optical means;

wherein the refractive space has a first surface on which the first optical element is disposed, and a second surface which is a surface opposite to the first surface;

wherein the virtual image light output from the image output unit enters the first optical element through the second surface of the refractive space, is reflected by the first optical element and then output through the second surface of the refractive space, and is then transferred to the second optical element; and wherein the second surface of the refractive space is formed as a free curved surface.

17. An optical device for augmented reality having a refractive space, the optical device comprising:

a first optical element configured to transfer virtual image light, output and transferred from an image output unit, to a second optical element;

the second optical element configured to transfer the virtual image light, transferred from the first optical element, toward a pupil of an eye of a user;

an optical means configured such that the first optical element and the second optical element are embedded and disposed therein; and the refractive space, the refractive space being formed inside the optical means;

wherein the refractive space has a first surface on which the first optical element is disposed, and a second surface which is a surface opposite to the first surface;

wherein the virtual image light output from the image output unit enters the first optical element through the second surface of the refractive space, is reflected by the first optical element and then output through the second surface of the refractive space, and is then transferred to the second optical element; and wherein the second surface of the refractive space is formed in a shape of a Fresnel lens.

18. An optical device for augmented reality having a refractive space, the optical device comprising:

a first optical element configured to transfer virtual image light, output and transferred from an image output unit, to a second optical element;

the second optical element configured to transfer the virtual image light, transferred from the first optical element, toward a pupil of an eye of a user;

an optical means configured such that the first optical element and the second optical element are embedded and disposed therein; and the refractive space, the refractive space being formed inside the optical means;

wherein the refractive space has a first surface on which the first optical element is disposed, and a second surface which is a surface opposite to the first surface;

wherein the virtual image light output from the image output unit enters the first optical element through the second surface of the refractive space, is reflected by the first optical element and then output through the second surface of the refractive space, and is then transferred to the second optical element; and wherein the second surface of the refractive space is formed of any one of a DOE and an HOE.

19. An optical device for augmented reality having a refractive space, the optical device comprising:

a first optical element configured to transfer virtual image light, output and transferred from an image output unit, to a second optical element;

the second optical element configured to transfer the virtual image light, transferred from the first optical element, toward a pupil of an eye of a user;

an optical means configured such that the first optical element and the second optical element are embedded and disposed therein; and the refractive space, the refractive space being formed inside the optical means;

wherein the refractive space has a first surface on which the first optical element is disposed, and a second surface which is a surface opposite to the first surface;

wherein the virtual image light output from the image output unit enters the first optical element through the second surface of the refractive space, is reflected by the first optical element and then output through the second surface of the refractive space, and is then transferred to the second optical element; and wherein an auxiliary refractive space is formed between the image output unit and the first optical element inside the optical means.

20. The optical device of claim 19, wherein the auxiliary refractive space is formed in a shape of any one of a convex lens and a concave lens when viewed from a side.

21. The optical device of claim 19, wherein a surface of the auxiliary refractive space is formed as a free curved surface.

22. The optical device of claim 19, wherein the auxiliary refractive space refracts and then outputs the virtual image light output from the image output unit.

23. The optical device of claim 19, wherein an inside of the auxiliary refractive space is empty.

24. The optical device of claim 19, wherein an inside of the auxiliary refractive space is vacuous.

25. The optical device of claim 19, wherein an inside of the refractive space is filled with a medium having a refractive index different from that of the optical means.

26. The optical device of claim 25, wherein the medium is gas, liquid or solid having a refractive index different from that of the optical means.

27. The optical device of claim 25, wherein the medium is a phase-change material whose refractive index changes depending on at least any one of a voltage difference, and temperature and pressure conditions.

* * * * *